United States Patent
Böttcher et al.

(10) Patent No.: US 9,157,370 B2
(45) Date of Patent: Oct. 13, 2015

(54) BURNER ASSEMBLY

(75) Inventors: Andreas Böttcher, Mettmann (DE);
Timothy A. Fox, Hamilton (CA);
Thomas Grieb, Krefeld (DE); Birgit Grüger, Dortmund (DE); Tobias Krieger, Duisburg (DE); Stephen A. Ramier, Fredericton (CA); Christin Schlensog, Mülheim an der Ruhr (DE); Holger Streb, Düsseldorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 851 days.

(21) Appl. No.: 13/255,559

(22) PCT Filed: Feb. 23, 2010

(86) PCT No.: PCT/EP2010/052259
§ 371 (c)(1),
(2), (4) Date: Nov. 16, 2011

(87) PCT Pub. No.: WO2010/105891
PCT Pub. Date: Sep. 23, 2010

(65) Prior Publication Data
US 2012/0047900 A1    Mar. 1, 2012

(30) Foreign Application Priority Data
Mar. 17, 2009 (EP) .................................... 09155370

(51) Int. Cl.
*F02C 1/00* (2006.01)
*F02C 7/22* (2006.01)
*F23R 3/28* (2006.01)
*F23R 3/36* (2006.01)

(52) U.S. Cl.
CPC . *F02C 7/222* (2013.01); *F23R 3/28* (2013.01); *F23D 2213/00* (2013.01); *F23R 3/36* (2013.01)

(58) Field of Classification Search
CPC .............. F02C 7/22; F02C 7/222; F23R 3/28; F23R 3/36
USPC .................... 60/734, 739, 796–799
See application file for complete search history.

(56) References Cited

U.S. PATENT DOCUMENTS

| | | | |
|---|---|---|---|
| 5,983,642 A | 11/1999 | Parker et al. | |
| 6,082,111 A | 7/2000 | Stokes | |
| 6,957,537 B2 * | 10/2005 | Hirasaki | 60/746 |
| 7,117,679 B2 * | 10/2006 | Toon et al. | 60/740 |
| 7,165,405 B2 * | 1/2007 | Stuttaford et al. | 60/737 |
| 7,942,002 B2 * | 5/2011 | Fish | 60/739 |

(Continued)

FOREIGN PATENT DOCUMENTS

| | | |
|---|---|---|
| CN | 1317633 A | 10/2001 |
| CN | 1670348 A | 9/2005 |

(Continued)

*Primary Examiner* — Gerald L Sung

(57) ABSTRACT

A burner assembly is provided. The burner assembly includes a support housing with a supply manifold, the supply manifold includes a fuel passage system, and fuel nozzles extending from the supply manifold and being supplied with fuel through the fuel passage system of the supply manifold. The supply manifold is sandwiched using at least two subparts.

16 Claims, 5 Drawing Sheets

(56) References Cited

U.S. PATENT DOCUMENTS

| | | |
|---|---|---|
| 2001/0004828 A1 | 6/2001 | Nakamoto |
| 2004/0055306 A1 | 3/2004 | North et al. |
| 2005/0188699 A1* | 9/2005 | Shafique et al. ............... 60/739 |
| 2006/0260317 A1* | 11/2006 | Prociw et al. ............... 60/739 |
| 2007/0204621 A1 | 9/2007 | Fish |
| 2007/0204622 A1* | 9/2007 | Patel et al. ............... 60/772 |
| 2008/0016870 A1 | 1/2008 | Morenko |
| 2008/0083223 A1* | 4/2008 | Prociw et al. ............... 60/739 |

FOREIGN PATENT DOCUMENTS

| | | |
|---|---|---|
| EP | 1688669 B1 | 7/2008 |
| RU | 2211408 C2 | 8/2003 |
| SU | 1777628 A3 | 11/1992 |

\* cited by examiner

BURNER ASSEMBLY

CROSS REFERENCE TO RELATED APPLICATIONS

This application is the US National Stage of International Application No. PCT/EP2010/052259, filed Feb. 23, 2010 and claims the benefit thereof. The International Application claims the benefits of European Patent Office application No. 09155370.1 EP filed Mar. 17, 2009. All of the applications are incorporated by reference herein in their entirety.

FIELD OF INVENTION

The present invention relates to a burner assembly, in particular to a burner assembly for gas turbines. In addition the invention relates to a gas turbine.

BACKGROUND OF INVENTION

A typical gas turbine burner assembly, as it is mainly used in so called canannular combustion systems is, for example, described in U.S. Pat. No. 6,082,111 and in US 2004/0055306 A1. Such burner assemblies typically comprise a cover plate to which a support housing is mounted. The support housing comprises a manifold with fuel and oil passages machined inside and fuel nozzles, so called rockets, extending from the manifold and being supplied with fuel through the gas and oil passages. Injection holes in the fuel nozzles guide the fuel out of the nozzles into a flow path of air delivered by the compressor of the gas turbine to the burner assembly. Swirlers are present in this flow path for providing a swirl to achieve a thorough mixing of fuel and air. This design of the support housing includes eight fuel nozzles (rockets), for example, which are welded to the manifold and also to the swirlers of a main swirler assembly.

However, the design described in the mentioned prior art is compromised by high costs for production of the manifold since machining of gas and oil channels into the manifold is elaborate and requires a high thickness of the manifold. After machining the fuel passages, cover plates are welded onto the manifold in order to close the passages. During the welding process care has to be taken not to induce too much stress in the manifold material due to the heat introduced during the welding process. Moreover, the material used for the manifold needs to be produced from a corrosion-resistant material since the fuel comes into contact with the walls of the gas or oil channels machined into the manifold. In addition, in use of the burner assembly the manifold will have a considerably higher temperature than the fuel delivered through the manifold. Hence, the material also needs to be stress resistant. Therefore, the manifold and the fuel nozzles of the state of the art burner assemblies are usually made from forged pieces which need to be finished by abrasive techniques in order to reduce susceptibility to tension cracks. The material requirements increase the cost for producing the manifold. In addition, corrosion resistant and stress resistant materials are usually difficult to machine, which even more increases production costs.

SUMMARY OF INVENTION

It is therefore an objective of the present invention to provide an advantageous burner assembly which helps to reduce the costs for producing the support housing.

It is a further objective of the present invention to provide an advantageous gas turbine.

The first objective is solved by a burner assembly as claimed in the claims, the second objective is solved by the gas turbine as claimed in the claims. The depending claims contain further developments of the invention.

An inventive burner assembly comprises a support housing with a supply manifold and fuel nozzles extending from the supply manifold. A fuel passage system which supplies the fuel nozzles with fuel is present in the supply manifold. The supply manifold is sandwiched from at least two subparts. The supply manifold is sandwiched of more subparts than kind of fuels in the fuel passage system.

That means, complex fuel passage systems, in particular dual fuel systems, can be realized. The supply manifold can as well be embodied for a single fuel system. In this case, the supply manifold could as well be assembled from only two subparts. A higher number of subparts allows for realizing more complicated fuel passage systems.

When the manifold is sandwiched from different subparts which are connected together, e.g. by bracing or welding, fuel passages such as gas and/or oil passages, can be machined in every subpart prior to connecting the subparts to one part, i.e. the sandwiched supply manifold. The machining can then be done from a side of the subpart which will be connected to another subpart, i.e. which will be an internal interface after combing the subparts to the sandwiched manifold. Additional welled joints to cover passages after machining, and the therewith involved stress generating introduction of heat, are then not necessary. Furthermore, the connections between different subparts can be located in low stressed areas so that lifetime behaviour of the sandwiched concept can be increased. Therefore, by sandwiching the supply manifold machining of the fuel passages can be simplified and, hence, the costs for production can be reduced.

The fuel passage system can comprise one or more notches which are machined in at least one of the subparts. In particular, the support manifold can be sandwiched from discoidal subparts each with two opposed disc faces where at least one notch is machined in at least one of the disc faces of at least one of the discoidal subparts. Compared to the fuel passages in the state of the art manifolds these notches are easy to machine into the subparts since the number of faces into which the notches can be machined is increased as compared to the monolithic state of the art manifold. After joining the subparts a notch can then form together with a notch or a face of an adjoining subpart a fuel passage of the sandwiched manifold. In particular, by machining at least one notch in at least one of the disc faces of every discoidal subpart, complex fuel passage systems, in particular dual fuel systems, i.e. systems for gas and oil, can be realized. A higher number of subparts allows for realizing more complicated fuel passage systems. Larger cross sections of a fuel passage can be realized if notches in disc faces which belong to different discoidal subparts and which are arranged in an opposing relationship to each other in the sandwiched manifold are located such as to be aligned with each other after joining the subparts.

The fuel nozzles can be fluidically connected to the fuel passage system by at least one through hole which extends from each notch to a fuel nozzle.

In the inventive burner assembly the one or more notches may themselves form at least one fuel channel of the fuel passage system. However, in a further development of the invention, at least one fuel pipe forming at least one fuel channel of the fuel passage system may be accommodated in the at least one notch and/or in the at least one through hole. By not using the notches themselves as the fuel channels the requirements to be made to the material in terms of corrosion resistance can be lowered since the fuel does not come into contact with the manifold material. Instead, the fuel only comes into contact with the fuel pipes which may be made from a highly corrosion resistive material. However, making the fuel pipes from such material is easier and cheaper than making the whole supply manifold from such a material. When accommodating fuel pipes in such notches the outer contours of the supply manifold do not need to be altered with respect to the aerodynamically optimized state of the art contours.

The end of the at least one fuel pipe, the material of which may be of a higher grade than the material of the subparts of the manifold, can be fixed to the manifold by welding or bracing. By this measure, issues related to sealing of the fuel pipes, i.e. gas and/or oil pipes, can be avoided.

An inventive gas turbine comprises at least one inventive burner assembly. By using the inventive burner assembly the costs related to manufacturing the combustors of a gas turbine can be reduced.

BRIEF DESCRIPTION OF THE DRAWINGS

Further features, properties and advantages of the present invention will become clear from the following description of embodiments of the invention in conjunction with the accompanying drawings.

DETAILED DESCRIPTION OF INVENTION

Figure 1:
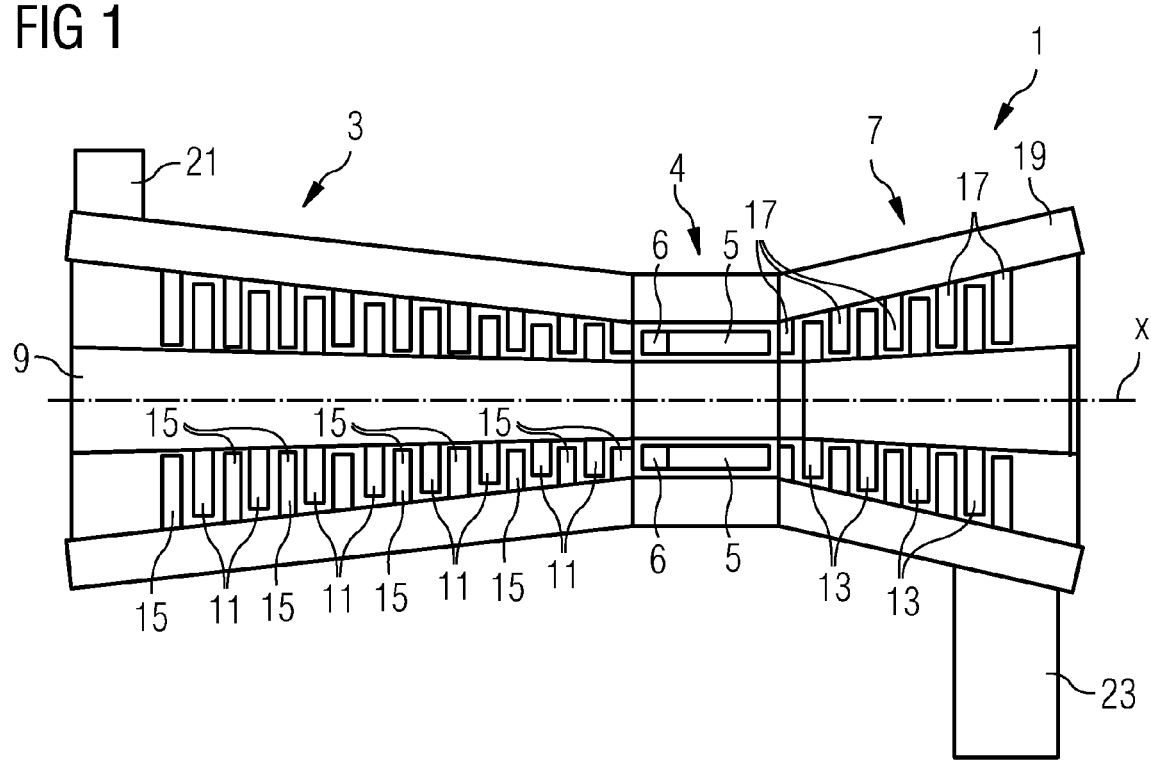
FIG. 1 shows a gas turbine engine in a highly schematic view.

FIG. 1 shows, in a highly schematic view, a gas turbine engine 1 comprising a compressor section 3, a combustor section 4 with a number of can-annular combustors 5 and with burner assemblies 6 arranged at the combustors, and a turbine section 7. A rotor 9 extends through all sections and carries, in the compressor section 3, rows of compressor blades 11 and, in the turbine section 7, rows of turbine blades 13. Between neighbouring rows of compressor blades 11 and between neighbouring rows of turbine blades 13, rows of compressor stator vanes 15 and turbine stator vanes 17, respectively, extend from a housing 19 of the gas turbine engine 1 radially inwards towards the rotor 9.

In operation of the gas turbine engine 1 air is taken in through an air inlet 21 of the compressor section 3. The air is compressed and led towards the burner assemblies 6 of the combustor section 4 by the rotating compressor blades 11. In the burner assemblies 6 the air is mixed with a gaseous or liquid fuel and the mixture is burnt in the combustors 5. Hot and pressurized combustion gas resulting from burning the fuel/air mixture is then fed to the turbine section 7. On its way through the turbine section 7 the hot and pressurized combustion gas transfers momentum to the turbine blades 13 while expanding and cooling, thereby imparting a rotational movement to the rotor 9 that drives the compressor and a consumer, e.g. a generator for producing electrical power or an industrial machine. The rows of turbine stator vanes 17 function as nozzles for guiding the hot and pressurized combustion gas so as to optimize the momentum transfer to the turbine blades 13. Finally, the expanded and cooled combustion gas leaves the turbine section 7 through an exhaust 23.

Figure 2:
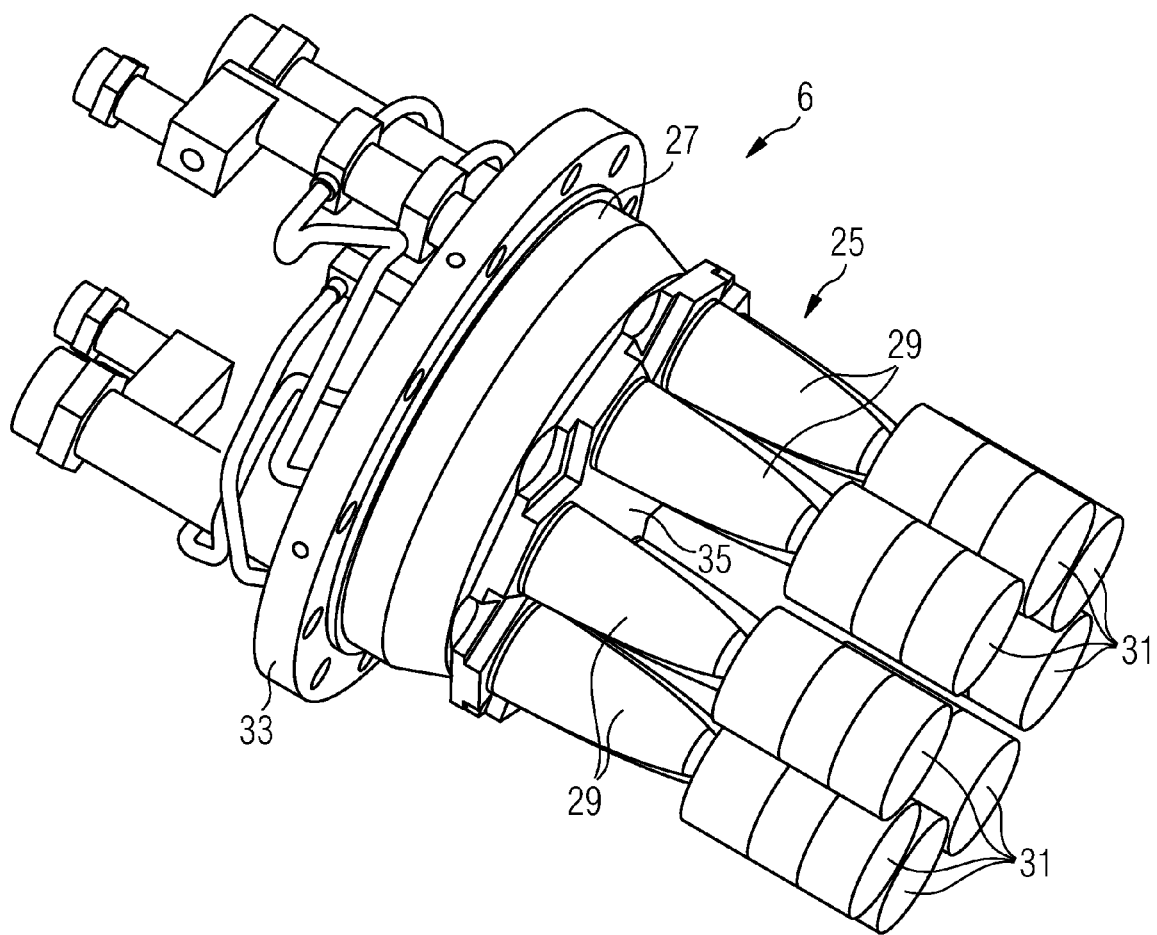
FIG. 2 shows an embodiment of an inventive burner assembly in a perspective view.

FIG. 2 shows in an perspective view, an embodiment of an inventive burner assembly 6 which comprises, as a main components a manifold 27, eight fuel nozzles 29 extending from the manifold 27 and eight swirlers 31 surrounding the tips of the fuel nozzles 29. The manifold 27 and the fuel nozzles 29 together form a support housing 25 of the burner assembly through which a fuel passage system extends to fuel injection openings in the tips of the fuel nozzles 29 (not visible since the injection openings are surrended by the swirlers 31).

Please note that although eight fuel nozzles 29 (sometimes also called rockets) are present in the burner assembly 6 the number of fuel nozzles 29 is not restricted to eight. There may, in principle, be more or less than eight fuel nozzles, e.g. six fuel nozzles or twelve fuel nozzles. Furthermore, a pilot fuel nozzle (not shown) can be inserted into a central opening 35 of the manifold 27.

When fitted to a can-annular combustor the manifold is fitted to the upstream end the combustor by means of a flange so that the fuel nozzles 29 show towards the combustion zone in the combustor. Compressor air can be lead through the swirlers 31 where the air is mixed with fuel and then introduced into the combustion zone where the fuel-air-mixture is burned to produce the working fluid of the gas turbine.

Figure 3:
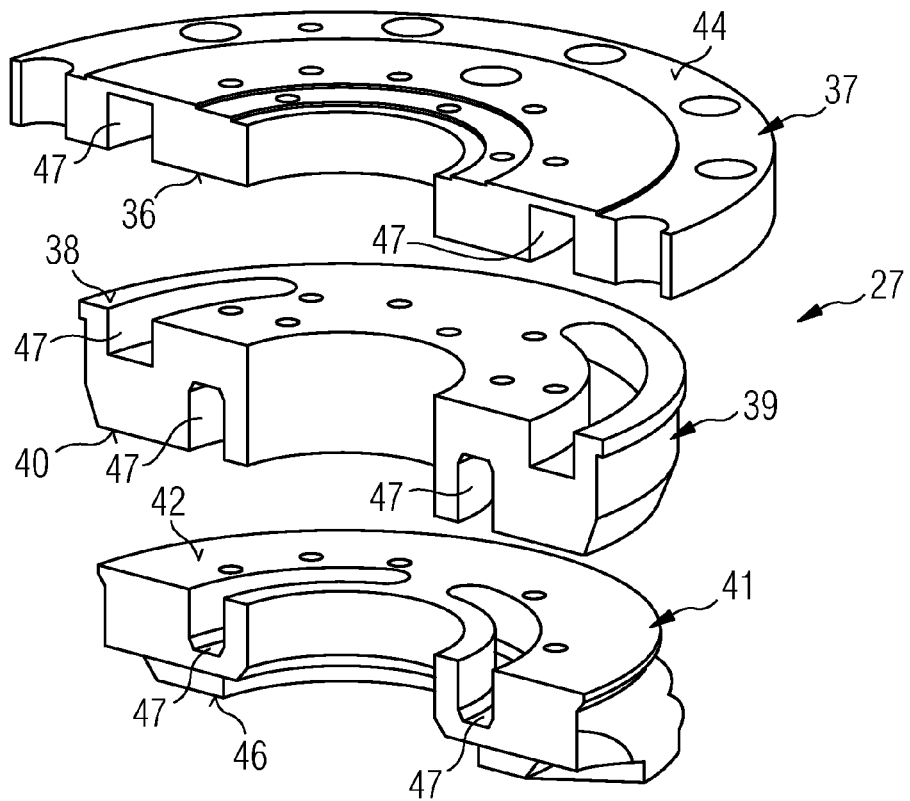
FIG. 3 shows a first alternative of the burner assembly's supply manifold in an exploded sectional view.
Figure 4:
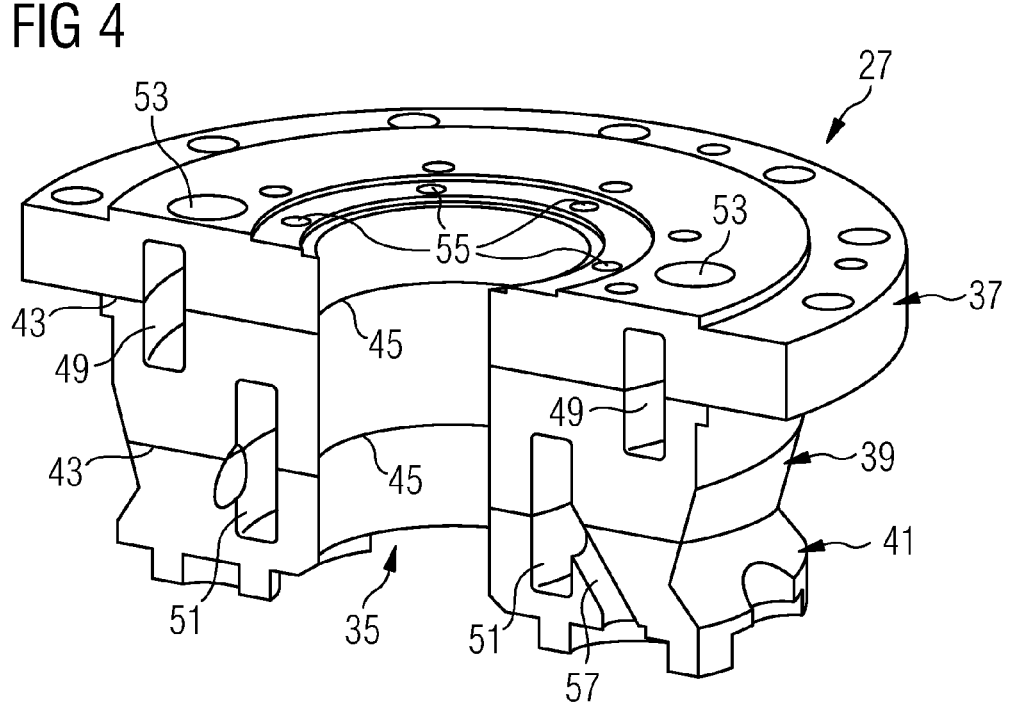
FIG. 4 shows the supply manifold of FIG. 3 in an assembled sectional view.

According to the invention, the manifold 27 of the burner assembly 6 is a sandwich of a number of subparts 37 to 41 with discoidal shapes. FIG. 3 shows the subparts 37 to 41 of the manifold 27 in an exploded sectional perspective view, and FIG. 4 shows the supply manifold 27 in an assembled state in a perspective sectional view. For producing the supply manifold 27 the subparts 37 to 41 are assembled such that their disc faces 36, 38, 40, 42 abut each other. Then they are welded or braced along circumferential outer seams 43 and inner seams 45 (located in the central opening 35). The disc faces 36, 38, 40 and 42 which abut each other in the assembled state of the manifold 27 will be called inner disc faces in the following to distinguish them from the disc faces 44 and 46 which will form outer faces of the manifold 27 after assembly. The disc faces 44 and 46 will be called outer disc faces in the following.

In the present embodiment, all inner disc faces 36, 38, 40 and 42 are provided with notches which fully or partly extend over the circumferentially of the respective disc. In the present embodiment the notches 47 in the inner disc face 36 of the disc 37 as well as the notches 37 in the inner disc face 38 of the disc 39 are located at a radial outer section of the respective disc 37, 39 while the notches 47 located in the inner disc face 40 of the disc 39 and the inner disc face 42 of the disc 41 are located at a radial inner section of the respective disc.

The notches 47 at the radial outer location are located such as to be aligned with each other when the supply manifold 27 is assembled. The notches then form together a gas channel 49 of the manifolds fuel passage system. In the same manner, the notches 47 located at the radial inner position are aligned with each other when the supply manifold 27 is assembled. These notches form together an oil channel 51 of the fuel passage system. Through holes 53 and 55, faulted in the discoidal parts and extending more or less in axial direction of the manifold 27, are also part of the fuel passage system for supplying gas to the gas channel 45 (through holes 53) and oil to the oil channel 51 (through holes 55), respectively. In addition, further through holes 57 connect the oil channel 51 with an internal fuel passage system of a fuel nozzle 29 (not shown in FIG. 4). Similar through holes connect the gas channel 49 with internal gas passage systems of the fuel nozzles 29.

Note that the burner assembly according to the present embodiment is a so called dual fuel burner assembly, i.e. a burner assembly which can be driven with either gaseous fuel or liquid fuel. To achieve this, four of the fuel nozzles 29 are connected via through holes 57 to the oil channel 51 while the other fuel nozzles 29 are connected via through holes 55 to the gas channel 49. However, the inventive burner assembly can as well embodied as a single fuel burner. In this case only an oil channel 51 or only a gas channel 49 would be present and all fuel nozzles would be connected to the same fuel channel. In this case, it would also be possible to embody the inventive burner assembly with only two discoidal subparts instead of three discoidal subparts. Moreover, although the fuel channels 49, 51 in the present embodiment are formed by corresponding notches 47 located in inner disc faces which are in an opposing relationship when the subparts are assembled together it would be sufficient to only form a notch in one of both opposing disc faces so that the other disc face (without notch) itself would form a wall of the respective fuel channel.

The sandwich design of the supply manifold 27 allows for forming the fuel channels 49, 51 before assembling the manifold 27. This is advantageous since the fuel channels 49, 51 do not need to be formed from an outer face 44, 46, like in the state of the art. Forming the fuel channels from an outer face necessitates a cover to be welded to the outer face for covering the fuel channel after machining the channels. Such covers, however, are located in critical areas of the manifold. Hence, the inventive sandwich design allows for removing weld seams in such critical areas. The weld- or bracing seams in the circumference of the manifold are less critical than the weld seams at the outer faces. Removing weld seams from critical areas improves the lifetime behaviour of a burner assembly. Moreover, the subparts are easy to assemble and can be welded or braced in a single working step.

Figure 5:
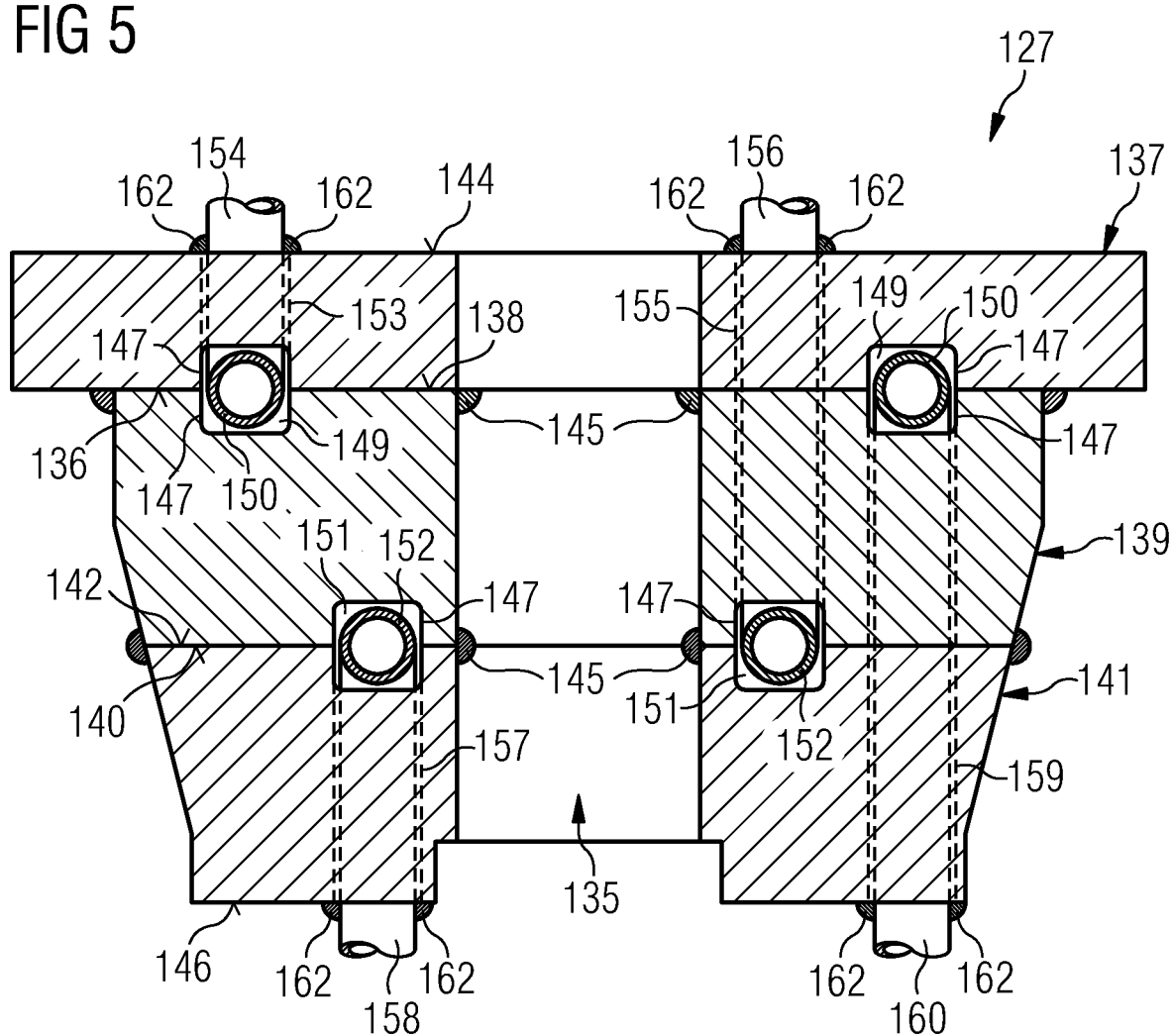
FIG. 5 shows a second alternative of the burner assembly's supply manifold in a sectional view.
Figure 6:
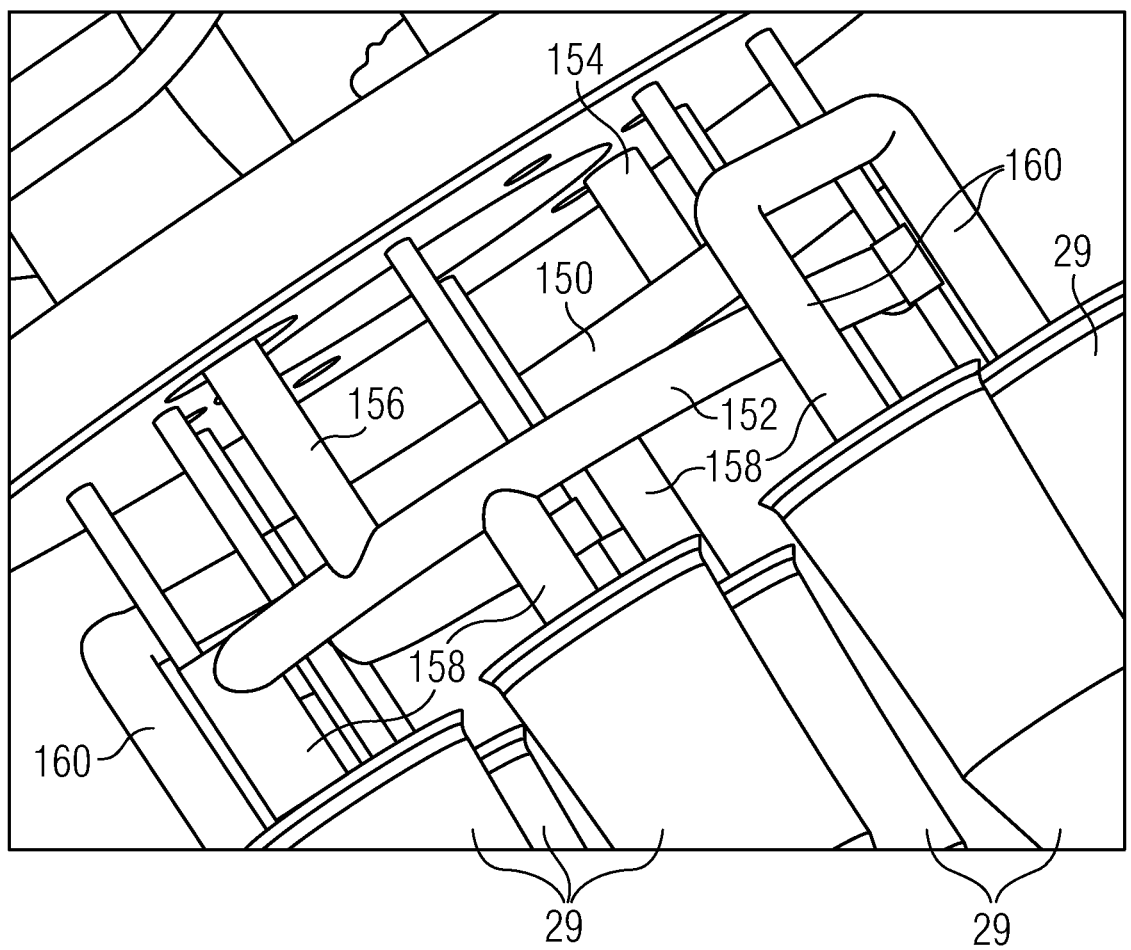
FIG. 6 shows an arrangement of fuel pipes in the burner assembly.

An alternative embodiment of the burner assembly's supply manifold is shown in FIGS. 5 and 6. Like in the embodiment shown in FIGS. 3 and 4 the supply manifold 127 is sandwiched from three discoidal subparts 137, 139, 141. The internal disc faces 136, 138, 140, 142 are provided with notches 137 which are aligned with corresponding notches in opposing disc faces when the manifold 127 is assembled. The notches 147 located in the inner disc face 136 and in the inner disc face 138 of the subpart 137 and 139, respectively, form together a radial outer channel 139 while the notches 137 located in the inner disc face 140 and the inner disc face 142 of the subpart 139 and subpart 141, respectively, form together a radial inner channel 151. Also shown in FIG. 5 are the weld or bracing seams 143 at the outer circumference of the manifold 127 and the weld or bracing seams 145 at the inner circumference.

In contrast to the embodiment shown in FIGS. 3 and 4 the channels 149 and 151 are not used as fuel channels but for accommodating fuel pipes 150, 152. While the radial outer fuel pipes 150 are used as gas pipes the radial inner fuel pipes 152 are used as oil pipes. At least one supply pipe 154 extend through through holes 153 connecting the channel 147 with the outer disc face 146 of the subpart 137. In the same manner, one or more supply pipes 156 extend through one or more through holes 155 connecting the channel 151 to the outer disc face 146 of the subpart 137. The through hole 155 comprises subsections extending through the subpart 137 and the subpart 139, respectively. The location of the through hole sections in both subparts 137, 139 is such that the sections are aligned with each other when the manifold 127 is assembled.

Furthermore, four supply pipes 158 extend through through holes 157 from the oil pipe 152 to the outer face 146 of the subpart 141. In a similar fashion, for supply pipes extend from the gas pipe 150 through through holes 159 to the outer face 146 of the subpart 141. Like the through hole 155 the through holes 159 comprise two subsections extending through different subparts 139, 141 and being located such in the subparts that they are aligned with each other when the manifold 127 is assembled.

The four supply pipes 158 connected to the oil pipe 152 are further connected with an internal oil passage system of the four oil nozzles extending from the manifold 127 (not shown in the figures). The gas supply channels 160 are each connected to a respective internal gas supply system of one of the four gas nozzles. All supply pipes 154, 156, 158, 160 are welded to the respective outer face 144, 146 of the supply manifold 127. By this means, a sealing of the supply manifold 127 is achieved. Instead of being welded to the outer faces 144, 146 the supply pipes could be braced to the outer faces.

The oil pipe 152, the gas pipe 150, and the respective supply pipes 154, 156, 160, 158 are shown in a perspective view without the supply manifold in FIG. 6. Note that although a supply manifold 127 for a dual fuel burner assembly is shown in FIGS. 5 and 6 the supply manifold can as well be embodied for a single fuel system. Then only one of the fuel pipes 150, 152 would be necessary. In this case, the supply manifold 127 could as well be assembled from only two subparts.

The embodiment shown in FIGS. 5 and 6 allows for reducing material costs of the supply manifold since the supply manifold's material does not come into contact with the fuel. Hence, the material can be chosen to be less corrosion resistant than in the first embodiment, which reduces material cost. The fuel pipes and the supply pipes can be easily manufactured from a higher grade material in terms of corrosion resistance than the subparts so that an overall cost reducing effect is still present. However, in addition to the cost effect there is also the effect that the lower grade material usable for the supply manifold is also easier to machine so that production time and costs can be reduced, too. All these advantages can be achieved without substantially altering the design of the supply manifold. In particular, the shape of the outer and inner circumference of the assembled supply manifold does not need to be altered at all. Therefore, the embodiment shown in FIGS. 5 and 6 can be realized without altering the aerodynamics of the supply manifold.

Independent of the embodiment, the inventive burner assembly reduces production costs since the sandwiched manifold is easy to machine and the subparts can be produced like bulk goods. Moreover, same or better lifetime behaviour than in the state of the art can be achieved by removing weld joints from critical locations.

The invention claimed is:
1. A burner assembly, comprising:
a support housing including a supply manifold, the supply manifold comprising:
a fuel passage system; and
a plurality of fuel nozzles extending from the supply manifold and being supplied with fuel through the fuel passage system of the supply manifold,
wherein the supply manifold includes a sandwich formation using at least two subparts and includes more subparts than kind of fuels in the fuel passage system, wherein the fuel passage system comprises a gas channel and an oil channel and the supply manifold includes a sandwich formation using at least three subparts, wherein at least one notch is disposed in the sandwich formation of the supply manifold to define at least a portion of the gas channel, and further wherein at least a further notch is disposed in the sandwich formation of the supply manifold to define at least a portion of the oil channel, wherein the at least one notch and the at least one further notch are machined in at least one of the subparts, wherein the supply manifold is sandwiched using discoidal subparts, each subpart including two opposed disc faces where the at least one notch and the at least one further notch are machined in at least one of the disc faces of at least one of the discoidal subparts, wherein the at least one notch and the at least one further notch are machined in at least one of the disc faces of every discoidal subpart.

2. The burner assembly as claimed in claim 1, wherein the plurality of notches in the plurality of disc faces which belong to different discoidal subparts and which are arranged in an opposing relationship to each other in the sandwiched supply manifold are located such as to be aligned with each other.

3. The burner assembly as claimed in claim 1, wherein a through hole extends from the at least one notch to a gas fuel nozzle.

4. The burner assembly as claimed in claim 1, wherein the at least one notch and the through hole forms the gas channel of the fuel passage system.

5. The burner assembly as claimed in claim 3, wherein the at least one notch or the through hole forms the gas channel of the fuel passage system.

6. The burner assembly as claimed in claim 3, wherein a gas fuel pipe forming the gas channel of the fuel passage system is accommodated in the at least one notch and in the through hole.

7. The burner assembly as claimed in claim 3, wherein a gas fuel pipe forming the gas channel of the fuel passage system is accommodated in the at least one notch or in the through hole.

8. The burner assembly as claimed in claim 6, wherein a first material of the fuel pipe is of higher grade than a second material of the subparts of the manifold.

9. The burner assembly as claimed in claim 6, wherein the ends of the fuel pipe are fixed to the manifold by welding or bracing.

10. A gas turbine, comprising a burner assembly, as claimed in claim 1.

11. The gas turbine as claimed in claim 10, wherein the subparts are welded or braced together.

12. The burner assembly as claimed in claim 1, wherein the subparts are welded or braced together.

13. The burner assembly as claimed in claim 1, wherein a further through hole extends from the at least one further notch to an oil fuel nozzle, wherein the at least one further notch and/or the further through hole form the oil channel of the fuel passage system.

14. The burner assembly as claimed in claim 3, wherein an oil fuel pipe forming the oil channel of the fuel passage system is accommodated in the at least one further notch and/or in the further through hole.

15. A burner assembly, comprising:
a support housing including a supply manifold, the supply manifold comprising:
a fuel passage system; and
a plurality of fuel nozzles extending from the supply manifold and being supplied with fuel through the fuel passage system of the supply manifold,
wherein the supply manifold includes a sandwich formation using at least two subparts and includes more subparts than kind of fuels in the fuel passage system, wherein the fuel passage system comprises a gas channel and an oil channel and the supply manifold includes a sandwich formation using at least three subparts, wherein at least one notch is disposed in the sandwich formation of the supply manifold to define at least a portion of the gas channel, and further wherein at least a further notch is disposed in the sandwich formation of the supply manifold to define at least a portion of the oil channel, wherein the at least one notch and the at least one further notch are machined in at least one of the subparts, wherein the supply manifold is sandwiched using discoidal subparts, each subpart including two opposed disc faces where the at least one notch and the at least one further notch are machined in at least one of the disc faces of at least one of the discoidal subparts, wherein the at least one notch and the at least one further notch are machined in at least one of the disc faces of every discoidal subpart, and wherein a gas turbine comprises the burner assembly.

16. A burner assembly, comprising:
a support housing including a supply manifold, the supply manifold comprising:
a fuel passage system; and
a plurality of fuel nozzles extending from the supply manifold and being supplied with fuel through the fuel passage system of the supply manifold,
wherein the supply manifold includes a sandwich formation using at least two subparts and includes more subparts than kind of fuels in the fuel passage system, wherein the fuel passage system comprises a gas channel and an oil channel and the supply manifold includes a sandwich formation using at least three subparts, wherein at least one notch is disposed in the sandwich formation of the supply manifold to define at least a portion of the gas channel and further wherein at least a further notch is disposed in the sandwich formation of the supply manifold, wherein the at least one notch and the at least one further notch are machined in at least one of the subparts, wherein the supply manifold is sandwiched using discoidal subparts, each subpart including two opposed disc faces where the at least one notch and the at least one further notch are machined in at least one of the disc faces of at least one of the discoidal subparts, wherein the at least one notch and the at least one further notch are machined in at least one of the disc faces of every discoidal subpart.

* * * * *